(12) United States Patent
Matsui

(10) Patent No.: US 7,588,339 B2
(45) Date of Patent: Sep. 15, 2009

(54) LIGHT EMITTING DEVICE

(75) Inventor: Hideki Matsui, Fujisawa (JP)

(73) Assignee: Nikon Corporation, Tokyo (JP)

( * ) Notice: Subject to any disclaimer, the term of this patent is extended or adjusted under 35 U.S.C. 154(b) by 210 days.

(21) Appl. No.: 11/632,036

(22) PCT Filed: Oct. 28, 2005

(86) PCT No.: PCT/JP2005/019921

§ 371 (c)(1),
(2), (4) Date: Jan. 10, 2007

(87) PCT Pub. No.: WO2006/049104

PCT Pub. Date: May 11, 2006

(65) Prior Publication Data

US 2008/0158854 A1 Jul. 3, 2008

(51) Int. Cl.
*F21V 9/16* (2006.01)
(52) U.S. Cl. .......................... 362/84; 362/11; 362/243
(58) Field of Classification Search ................ 362/84, 362/249, 252, 243, 11
See application file for complete search history.

(56) References Cited

U.S. PATENT DOCUMENTS 6,814,475 B2 * 11/2004 Amano ....................... 362/487

FOREIGN PATENT DOCUMENTS

| CN | 2646554 Y | 10/2004 |
|---|---|---|
| EP | 1 081 771 A2 | 3/2001 |
| JP | A 10-208516 | 8/1998 |
| JP | A 2000-133006 | 5/2000 |
| JP | A 2003-141910 | 5/2003 |
| JP | A 2004-039594 | 2/2004 |
| JP | A 2004-505172 | 2/2004 |
| JP | A 2004-226509 | 8/2004 |
| WO | WO 00/19546 A1 | 4/2000 |
| WO | WO 02/11173 A1 | 2/2002 |

* cited by examiner

*Primary Examiner*—John A Ward
(74) *Attorney, Agent, or Firm*—Oliff & Berridge, PLC

(57) ABSTRACT

Blue component light emitted from blue LEDs is reflected to a Fresnel lens at a reflecting member having a parabolic cross-section. The fluorescent material is added substantially uniformly in the Fresnel lens. Part of the blue component light is transmitted through the Fresnel lens while another part of blue component light undergoes wavelength conversion at the Fresnel lens. By the wavelength conversion, the fluorescent material in the Fresnel lens is excited by the blue component light and the fluorescent light thus excited emits light containing a yellow color component. The yellow component light resulting from the wavelength conversion is projected via the Fresnel lens as uniform light with the blue component light.

17 Claims, 9 Drawing Sheets

LIGHT EMITTING DEVICE

TECHNICAL FIELD

The present invention relates to a light emitting device adopting a photoluminescence technology.

BACKGROUND ART

There is a light emitting device known in the related art (see patent reference literature 1) that uses light emitted from an LED as an excitation light to excite photoluminescence. Patent reference literature 1 describes a light emitting device that emits LED light (primary light) containing a blue color component into a fluorescent member and obtains secondary light (with the frequency thereof gradually reduced) with a longer wavelength than that of the primary light. Patent reference literature 1 discloses that by selecting a specific type of fluorescent material to constitute the fluorescent member, light with a specific color can be obtained as the secondary light and white light can be further generated by mixing the secondary light with a blue component light (primary light).

Patent reference literature 1: Japanese Translation of PCT International Application No. 2004-505172

DISCLOSURE OF THE INVENTION

Problems to be Solved by the Invention

Patent reference literature 1 discloses a light emitting device that includes a plurality of LEDs (semiconductor elements) disposed within a block shaped housing. The fluorescent material is applied to all the interior surfaces including the bottom surface, the side walls and the cover of the housing. While mixed color light is generated within the housing at the light emitting device, the specific paths through which the light travels inside the housing before and after the colors are mixed are not known and there is a concern that the colors may not be uniformly mixed. If the different colors of light are not uniformly mixed in the light emitting device, uneven coloration or color bleeding may be observed in the light exiting the housing.

Means for Solving the Problems

A light emitting device according to a first aspect of the present invention includes: a light emitting device that emits excitation light used to excite a fluorescent material; a reflecting device that reflects the excitation light; and a projection optical member containing the fluorescent material, that receives the excitation light having been reflected at the reflecting device and projects photoluminescence light emitted from the fluorescent material.

A light emitting device according to a second aspect of the present invention includes: a light emitting device that emits excitation light used to excite a fluorescent material; a reflecting device that reflects the excitation light; and a projection optical member containing the fluorescent material, that receives both the excitation light having been reflected at the reflecting device and the excitation light directly traveling from the light emitting device and projects photoluminescence light emitted from the fluorescent material.

In the first or second aspect, it is preferable that the light emitting device is constituted with an LED array. It is preferable that the LED array is formed by adopting any one of the following modes; (1) the LED array is formed at one surface of a substrate, (2) the LED array is formed at each of two surfaces of a substrate, (3) the LED array is formed at each of N substrates assembled together into an N-angle prism shape and (4) the LED array is formed at a polyhedral body with a shape that is not univocally defined. It is preferable that the excitation light emitted from the light emitting device contains a blue color component; and the photoluminescence light emitted from the fluorescent material contains a yellow color component.

In the first or second aspect, the projection optical member may be constituted of resin into which the fluorescent material is added substantially uniformly. The reflecting device may be formed so as to have a parabolic cross-section.

A camera according to a third aspect of the present invention includes the above described light emitting device.

It is to be noted that the light emitting device that emits excitation light may be replaced with a light emitting means and the reflecting device that reflects the excitation light may be replaced with a reflecting means.

BEST MODE FOR CARRYING OUT THE INVENTION

The following is an explanation of the best mode for carrying out the present invention, given in reference to the drawings.

FIRST EMBODIMENT

Figure 1:
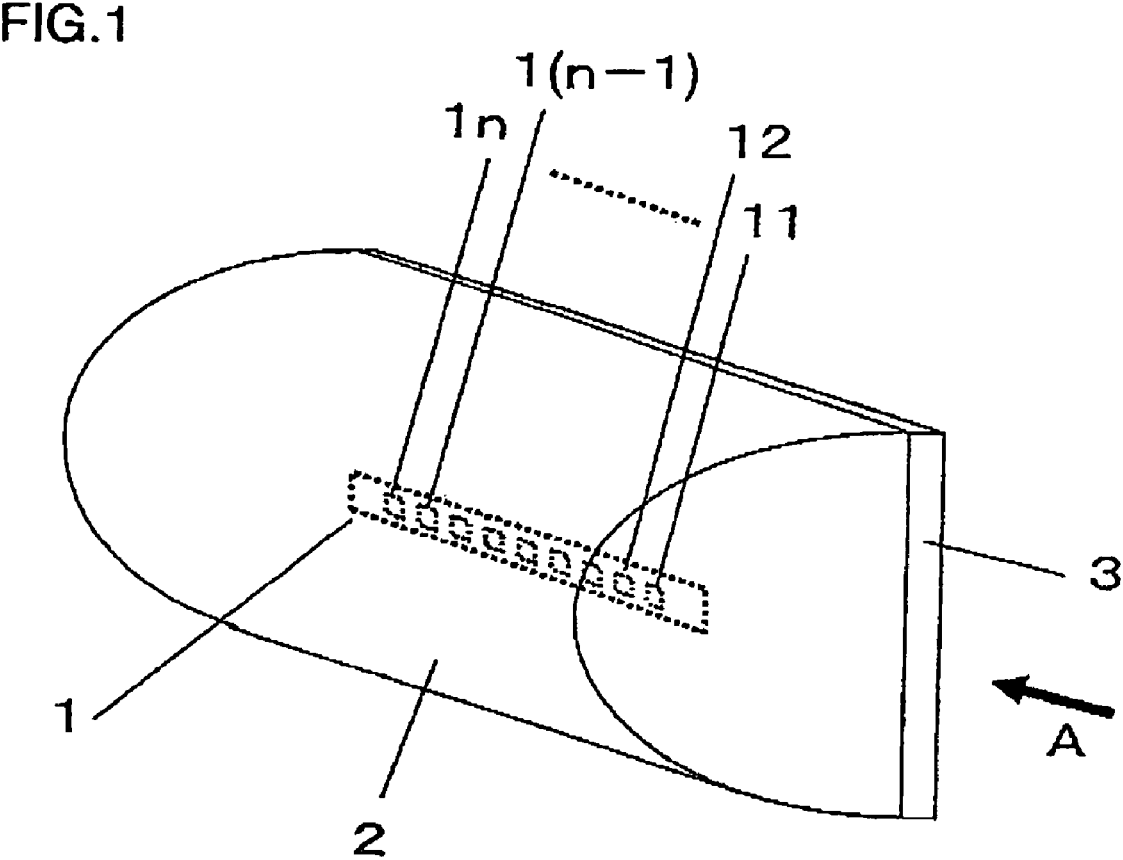
FIG. 1 is a perspective showing the structure adopted in a light emitting device achieved in a first embodiment of the present invention.

FIG. 1 is a perspective showing the structure adopted in a light emitting device achieved in the first embodiment of the present invention. FIG. 1 shows blue color light emitting array consisting of "n" elements 11 to 1n, mounted on a substrate 1. The blue color light emitting elements 11 to 1n may each be constituted with, for instance, a light emitting diode (LED) which emits light containing a blue color component with a wavelength of 450 nm.

Figure 2:
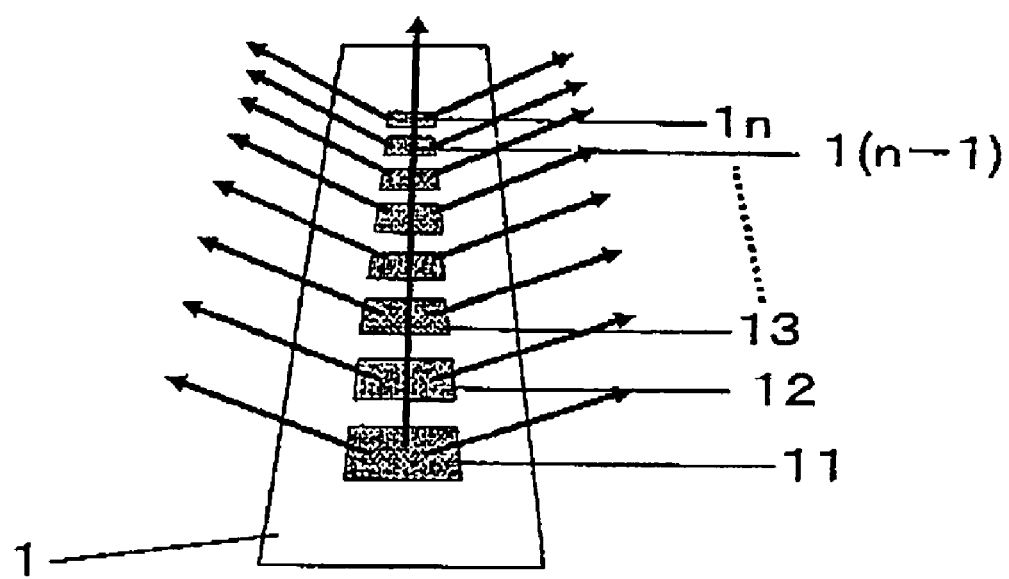
FIG. 2 is a perspective showing in an enlargement a substrate and LEDs.

FIG. 2 is a perspective showing in an enlargement the substrate 1 and the blue LEDs 11 to 1n. The drive of the individual blue LEDs 11 to 1n is controlled by a current supply circuit (not shown) so that they emit light with a uniform level of light emission luminance. The light generated at the blue LEDs 11 to 1n is emitted toward a reflecting member 2.

Figure 3:
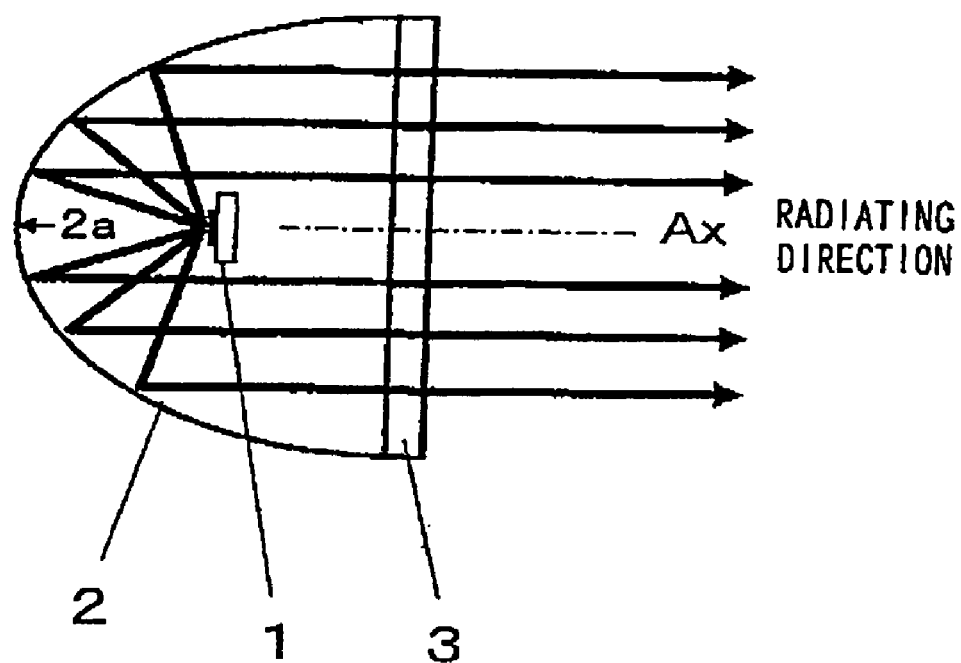
FIG. 3 is a side elevation of the light emitting device in FIG. 1.

FIG. 3 is a side elevation of the light emitting device in FIG. 1, viewed from the direction indicated by an arrow A. As shown in FIG. 3, the reflecting member 2 is formed so as to have a parabolic cross-section, with a Fresnel lens 3 disposed at an opening of the reflecting member 2. The reflecting member 2, which may be constituted of a high-luminance aluminum material, reflects at its inner surface (a concave curved surface) 2a the light from the blue LEDs 11 to 1n toward the Fresnel lens 3 with a high level of reflectance. The light containing the blue color component thus enters the Fresnel lens 3 as substantially parallel light.

Part of the blue component in the light having entered the Fresnel lens 3 is transmitted through the Fresnel lens 3 and is projected as uniform light advancing along the radiating direction (to the right in FIG. 3). In this regard, the Fresnel lens 3 functions as a projection optical member. It is to be noted that the Fresnel lens 3 is formed by ensuring that the luminance of the light projected onto the area (near an optical axis Ax of the Fresnel lens 3 in FIG. 3) corresponding to the shadow of the substrate 1 is not lower than the luminance of the light projected onto other areas.

The Fresnel lens 3 may be constituted of, for instance, a resin, into which a fluorescent material with a predetermined concentration level is substantially uniformly added. Thus, another part of the blue component light undergoes wavelength conversion at the Fresnel lens 3 while the part of the blue component light is transmitted through the Fresnel lens 3 as described earlier. Namely, the fluorescent material added into the Fresnel lens 3 is excited by the incident light and the fluorescent material thus excited emits light containing a yellow color component (with a wavelength in a range of, for instance, 560 nm to 570 nm). The yellow component light resulting from the wavelength conversion is projected via the Fresnel lens 3 as uniform light advancing along the radiating direction (to the right in FIG. 3), in a manner similar to that with which the blue component light is projected. As a result, the blue component light and the yellow component light become uniformly mixed over the radiation range, and the mixed light is observed by the human eye as white light with uniform luminance, free of uneven coloration or color bleeding.

The following operational effects can be achieved in the first embodiment described above.

(1) The blue component in the light emitted from the blue LEDs 11 to 1n used as a light emitting means is reflected at the reflecting member i.e., a reflecting means 2, formed so as to have a parabolic cross-section, and the reflected light is then guided to the Fresnel lens 3. Thus, even when the directions of the light fluxes originating from the blue LEDs 11 to 1n are not uniform (e.g., even when the light fluxes are emitted diagonally to the left and to the right as well as along the upward direction in FIG. 2), the blue color component light can be guided to the Fresnel lens 3 with a high level of reliability. This, in turn, allows efficient utilization of the blue component light emitted from the blue LEDs 11 to 1n and, at the same time, minimizes the extent of inconsistency in the luminance of the blue component light entering the Fresnel lens 3.

(2) Since the fluorescent material is contained in the Fresnel lens 3 alone, only the blue component light (excitation light) is allowed to enter the Fresnel lens 3. As a result, the blue component light and the yellow component light (photoluminescence light) generated within the Fresnel lens 3 can be mixed efficiently.

(3) The fluorescent material is mixed with substantial uniformity in the Fresnel lens 3, which allows the blue component light being transmitted through the Fresnel lens 3 to undergo wavelength conversion uniformly, regardless of the specific positions in the Fresnel lens 3 at which it is being transmitted. As a result, uniformity is achieved both in the luminance of the outgoing yellow component light resulting from the wavelength conversion at the Fresnel lens 3 and in the luminance of the outgoing blue component light transmitted through the Fresnel lens 3, as the yellow component light and the blue component light are radiated over the radiation range. Consequently, white light with a minimum extent of uneven coloration and color bleeding is obtained.

(4) Since the yellow component light and the blue component light are emitted via the Fresnel lens 3 into which a fluorescent material has been evenly added, the luminance of the light projected over the area (near the optical axis Ax of the Fresnel lens 3) corresponding to the shadow of the substrate 1 is not lowered compared to the luminance of the light projected onto the other areas, achieving uniform illumination of the radiation range, unlike in a structure in which the yellow component light and the blue component light are emitted via a plane parallel plate member constituted of a material into which a fluorescent material is evenly mixed.

The number "n" of the blue LEDs 11 to 1n may assume any value, e.g., 1 or 10, and the number "n" of blue LEDs should be adjusted to an optimal value in correspondence to the range over which the light from the light emitting device is to be radiated along the horizontal direction.

While the blue LEDs 11 to 1n are disposed in a single row in the example explained above, they may instead be disposed over two rows or four rows, and the number of rows over which the blue LEDs are to be disposed should be adjusted to an optimal value in correspondence to the range over which the light from the light emitting device is to be radiated along the vertical direction.

While the reflecting member 2 is constituted of an aluminum material with a high level of luminance having a parabolic shape, it may instead be constituted with a different material with a high reflectance. In addition, instead of obtaining the reflecting member 2 by machining a material assuming the form of a flat sheet into a parabolic shape, the reflecting member 2 may be formed by combining a plurality of very small reflecting members into a parabolic shape.

SECOND EMBODIMENT

Figure 4:
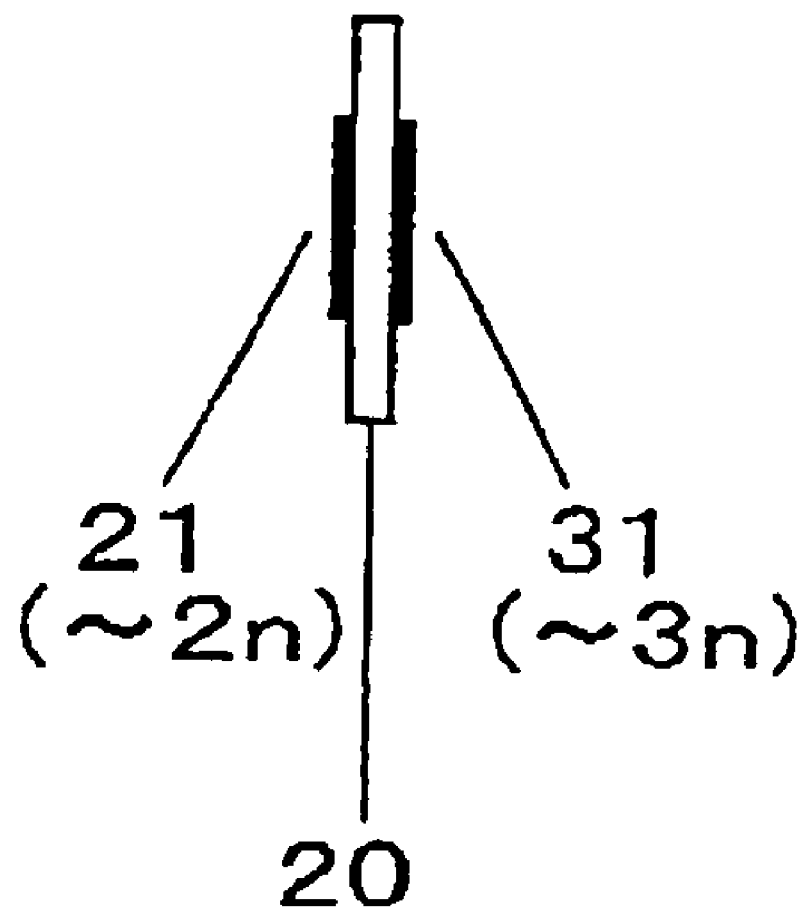
FIG. 4 is an enlargement of a substrate used in a second embodiment.

Blue LEDs may be mounted at the two sides of a substrate. FIG. 4 is an enlargement of a substrate 20 used in the second embodiment. Blue LEDs 21 to 2n are mounted at one surface of the substrate 20, whereas blue LEDs 31 to 3n are mounted at the other surface of the substrate 20. The drive of the individual blue LEDs 21 to 2n and 31 to 3n is controlled by a current supply circuit (not shown) so that they emit light with a uniform level of light emission luminance.

Figure 5:
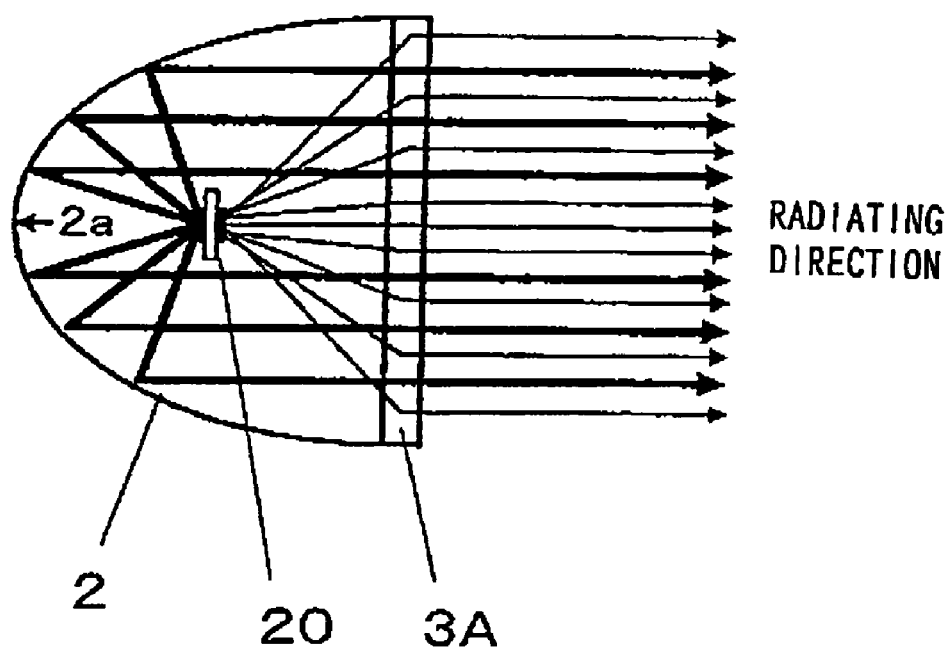
FIG. 5 is a side elevation of a light emitting device achieved in the second embodiment.

FIG. 5 is a side elevation of a light emitting device that includes the substrate 20. FIG. 5 shows a diffusion lens 3A disposed at an opening of a reflecting member 2 formed so as to have a parabolic cross-section. The reflecting member 2 reflects at its inner surface (concave curved surface) 2a the blue color component of the light emitted from the blue LEDs 21 to 2n toward the diffusion lens 3A with high reflectance. As a result, the light containing the blue color component enters the diffusion lens 3A as substantially parallel light.

The blue component light from the blue LEDs 31 to 3n mounted at the surface of the substrate 20 further toward the diffusion lens 3A, on the other hand, directly enters the diffusion lens 3A without being reflected at the reflecting member 2.

The diffusion lens 3A is constituted with a resin into which a fluorescent material achieving a predetermined concentration is substantially uniformly added. Part of the blue component light having entered the diffusion lens 3A is transmitted and is projected as uniform light advancing along the radiating direction (to the right in FIG. 5). Another part of the blue component light undergoes wavelength conversion at the diffusion lens 3A to become light containing a yellow color component, which is then projected in much the same way as the blue component light, as uniform light advancing along the radiating direction (to the right in FIG. 5). As a result, the blue component light and the yellow component light become uniformly mixed over the radiation range, and the mixed light is observed by the human eye as white light of uniform brightness, free of uneven coloration. It is to be noted that the diffusion lens 3A may also be referred to as a projection optical member.

The following operational effects can be achieved in the second embodiment described above.

(1) The blue LEDs are mounted at the two surfaces of the substrate 20 and the blue component light from the blue LEDs 21 to 2n and the blue component light from the blue LEDs 31 to 3n, mounted at the two sides of the substrate 20, are individually guided to the diffusion lens 3A. As a result, the light emission luminance twice that from LEDs mounted at a single side of the substrate is achieved, making it possible to provide a compact light emitting device with high luminance.

(2) Since a fluorescent material with a predetermined concentration level is substantially uniformly mixed into the material constituting the diffusion lens 3A, the blue component light passing through the diffusion lens 3A is allowed to undergo wavelength conversion uniformly, regardless of the specific positions in the diffusion lens 3A, at which it is being transmitted. As a result, uniformity is achieved both in the luminance of the outgoing yellow component light resulting from the wavelength conversion at the diffusion lens 3A and in the luminance of the outgoing blue component light having been transmitted through the diffusion lens 3A, as the yellow component light and the blue component light are radiated over the radiation range, and white light with minimum extent of uneven coloration and color bleeding is obtained, as in the first embodiment.

Figure 6:
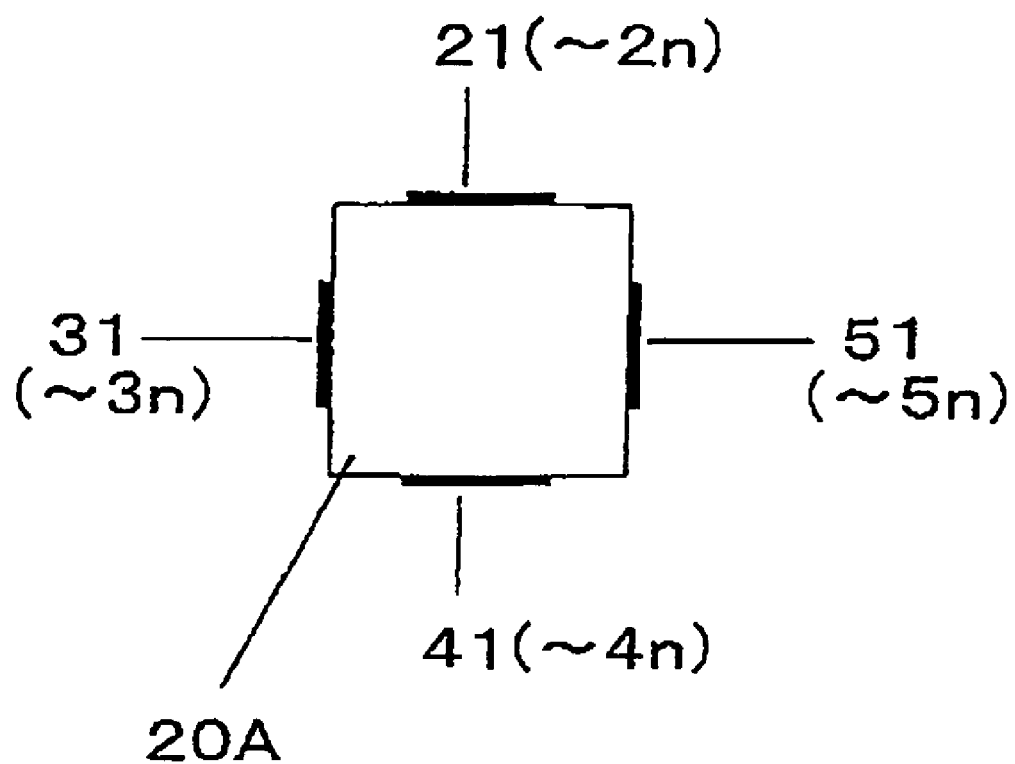
FIG. 6 presents an example of an LED mounting substrate assuming a quadrangular prism shape.

Blue LEDs may also be mounted at the surfaces of substrates assembled together to form the shape of a polygonal prism. FIG. 6 presents an example of an LED mounting substrate assuming a quadrangular prism shape. FIG. 6 shows groups of blue LEDs, blue LEDs 21 to 2n, blue LEDs 31 to 3n, blue LEDs 41 to 4n and blue LEDs 51 to 5n, each mounted at one of the four surfaces of a substrate assembly 20A. The drive of the individual blue LEDs is controlled by a current supply circuit (not shown) so that they all emit light with a uniform level of light emission luminance. The substrate assembly 20A is used as a light emitter in place of the substrate 20 in the light emitting device shown in FIG. 5.

Figure 7:
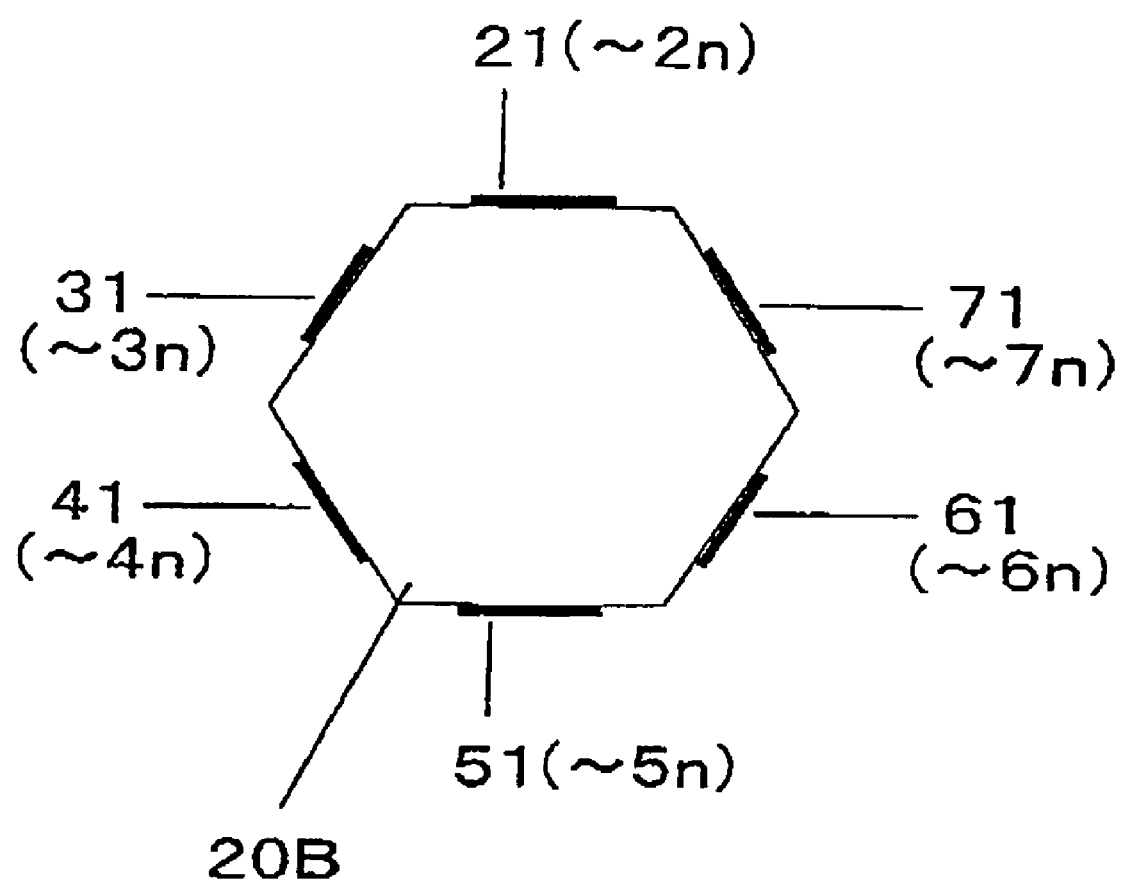
FIG. 7 presents an example of an LED mounting substrate assuming a hexagonal prism shape.

FIG. 7 presents an example of an LED mounting substrate assuming a hexagonal prism shape. FIG. 7 shows groups of blue LEDs, blue LEDs 21 to 2n, blue LEDs 31 to 3n, blue LEDs 41 to 4n, blue LEDs 51 to 5n, blue LEDs 61 to 6n and blue LEDs 71 to 7n, each mounted at one of the six surfaces of a substrate assembly 20B. The drive of the individual blue LEDs is controlled by a current supply circuit (not shown) so that they all emit light with a uniform level of light emission luminance. The substrate assembly 20B is used as a light emitter in place of the substrate 20 in the light emitting device shown in FIG. 5.

In the light emitting device described above with blue LEDs mounted at the surfaces of substrates assembled into a polygonal prism shape (N-angle prism shape), the blue component light can be invariably guided to the diffusion lens 3A reliably regardless of whether the blue component light is emitted toward the reflecting member 2 or toward the diffusion lens 3A. By mounting LEDs at the four surfaces of a quadrangular prism-shaped substrate assembly, a light emission luminance twice that from a light emitting device with LEDs mounted at the two surfaces of a single substrate is achieved, whereas by mounting LEDs at the six surfaces of a hexagonal prism-shaped substrate assembly, a light emission luminance three times that of a light emitting device with LEDs mounted at the two surfaces of a single substrate, is achieved. In either case, a compact light emitting device with high luminance is achieved.

The substrate assembly assuming a polygonal prism shape (N-angle prism shape) may be an octagonal prism assembly or a decagonal prism assembly.

Figure 9:
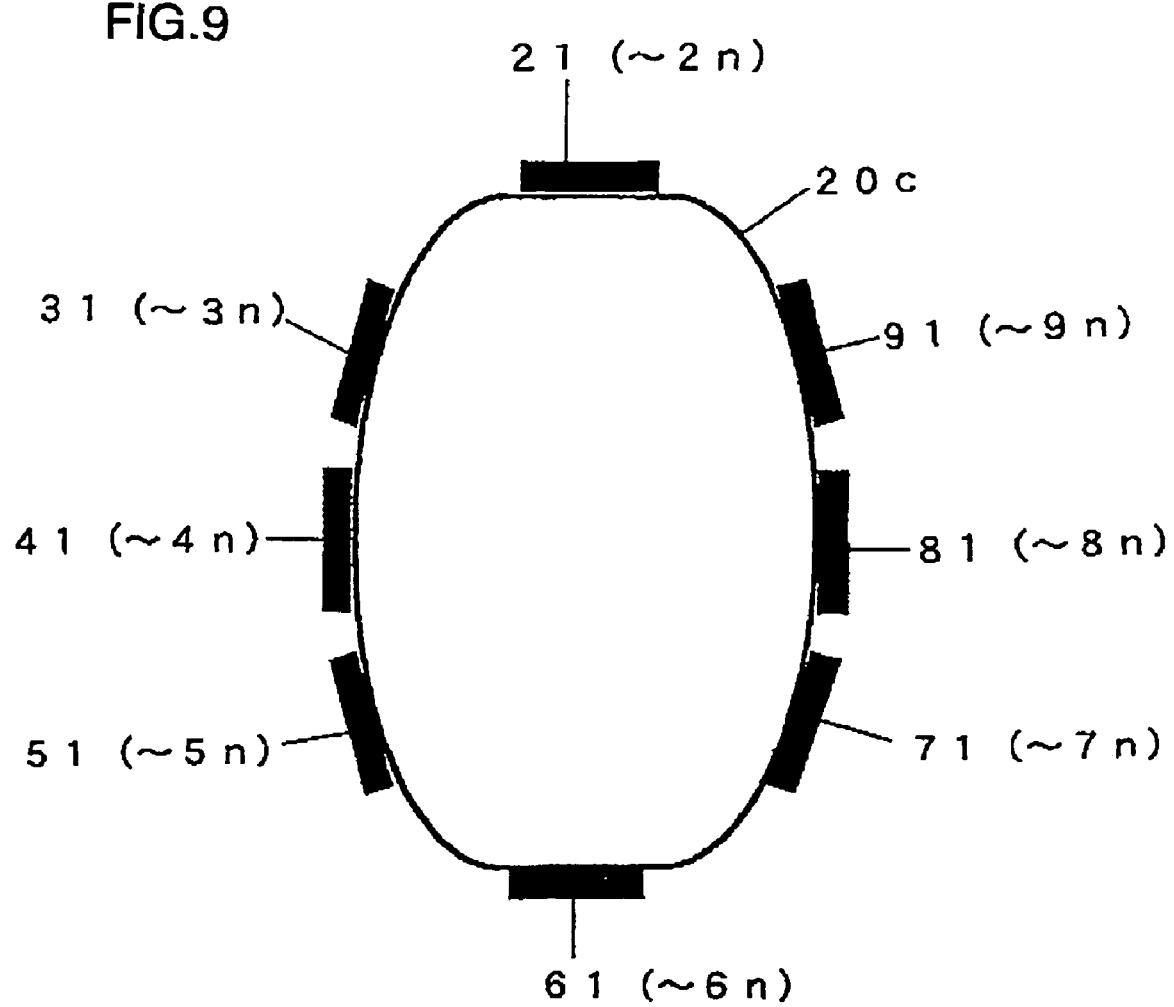
FIG. 9 presents an example of an LED mounting substrate assuming a polyhedral shape.

Alternatively, blue LEDs may be mounted on a polyhedron assembly achieved by combining surfaces including a curved surface, instead of a polygonal prism substrate assembly achieved by combining flat surfaces. For instance, groups of blue LEDs 21 to 2n, 31 to 3, 41 to 4n, 51 to 5n, 61 to 6n, 71 to 7n, 81 to 8n and 91 to 9n may be mounted at a flexible substrate 20C or the like constituted as a polyhedral body, as shown in FIG. 9, so as to form LED arrays at a polyhedral substrate assuming any shape instead of a univocally defined shape such as a polygonal prism.

Figure 8:
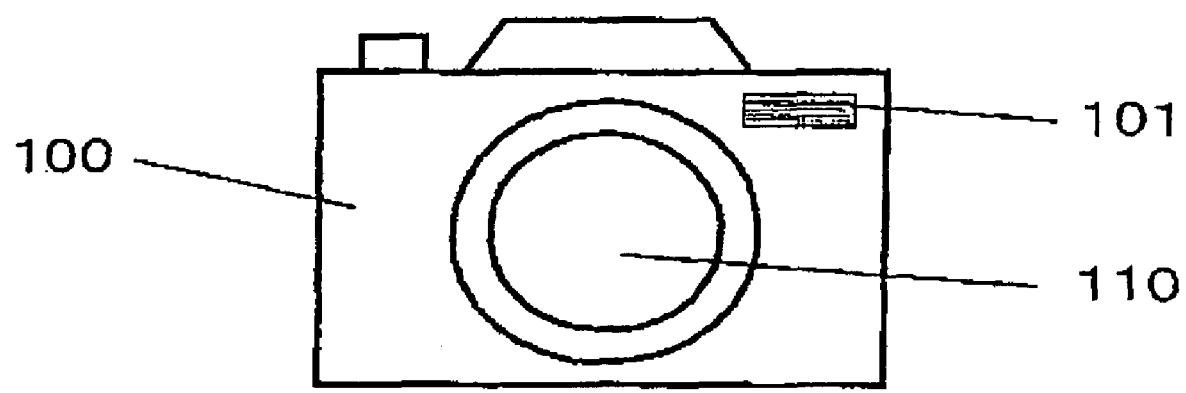
FIG. 8 is an external view of a camera equipped with a light emitting device.

Any of the light emitting devices described above may be used as a photographic illuminating device in the camera shown in FIG. 8. FIG. 8 shows an interchangeable photographic lens 110 mounted at a camera body 100. An illuminating device 101 is provided as an internal unit in the camera body 100 at the upper right position, viewed from the subject side. The illuminating device 101 is constituted with the light emitting device explained earlier.

The light emitting device may be utilized as a light source in a portable telephone equipped with a camera, a toy, a lighting device, a flashlight or the like, or as an illuminating device in a camera.

While an explanation is given above on an example in which LED light containing the blue component light is used as the photoluminescence primary light (excitation light) to obtain the yellow component light (secondary light), the wavelength component of the primary light and the wavelength component (color component) of the secondary light may be different from those in the example explained above. An optimal type of fluorescent material to be added into the material to constitute the Fresnel lens (or the diffusion lens) should be selected in correspondence to the specific purposes of use for the light emitting device, in conjunction with light emitting elements capable of emitting light with the optimal wavelength to be used as the excitation light source. For instance, LEDs that emit light with different color components may be mounted at the individual surfaces of the substrate assembly 20A or 20B assuming a polygonal prism shape in FIG. 6 or 7. More specifically, blue LEDs may be mounted at one surface, red LEDs may be mounted at another surface and green LEDs may be mounted at yet another surface. In this case, light can be emitted by selecting the optimal LEDs for light emission under specific circumstances. With the light emitting device adopting this structure, light containing the optimal color components for conditions can be obtained via the single light emitting device. It is to be noted that a plurality of LEDs that emit light corresponding to a plurality of color components may be disposed at the substrate 1 shown in FIG. 1.

The color mixing ratio for the primary light and the secondary light should be adjusted by adjusting the content of the fluorescent material added into the material constituting the Fresnel lens 3 (or the diffusion lens 3A) or adjusting the thickness of the Fresnel lens 3 (or the diffusion lens 3A). For instance, the ratio of the secondary light is raised by increasing the content of the fluorescent material and the ratio of the secondary light can be lowered by reducing the fluorescent material content. In addition, the ratio of the secondary light can be raised by increasing the thickness of the Fresnel lens 3 (or the diffusion lens 3A) and the ratio of the secondary light can be lowered by reducing the thickness of the Fresnel lens 3 (or the diffusion lens 3A), without altering the fluorescent material content at all.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2004-318151 filed Nov. 1, 2004

The invention claimed is:

1. An illuminating device, comprising:
   a substrate;
   a light emitting member that comprises a first light emitter mounted at a first surface of the substrate and a second light emitter mounted at a second surface which is a back side of the first surface, with the first light emitter and the second light emitter emitting excitation light used to excite a fluorescent material;
   a reflecting member that reflects a first excitation light emitted from the first light emitter; and
   a projection optical member containing the fluorescent material that is excited by the first excitation light emitted from the first light emitter and then reflected at the reflecting member and a second excitation light emitted from the second light emitter so as to generate photoluminescence light, wherein:
   the projection optical member projects white light obtained by mixing of the first excitation light, the second excitation light and the photoluminescence light.

2. An illuminating device according to claim 1, wherein:
   the first excitation light emitted from the first light emitter and the second excitation light emitted from the second light emitter each contain a blue color component; and
   the photoluminescence light emitted from the fluorescent material contains a yellow color component.

3. An illuminating device according to claim 2, wherein:
   the projection optical member is constituted of resin into which the fluorescent material is added substantially uniformly.

4. An illuminating device according to claim 1, wherein:
   the first light emitter and the second light emitter are each constituted with an LED array.

5. An illuminating device according to claim 4, wherein:
   the first light emitter and the second light emitter emit light with a uniform level of luminance.

6. An illuminating device according to claim 1, wherein:
   the reflecting member is formed so as to have a parabolic cross-section.

7. An illuminating device according to claim 1, wherein:
   the projection optical member includes a diffusion lens.

8. An illuminating device according to claim 1, wherein:
   the substrate is a flexible substrate.

9. An illuminating device according to claim 1, wherein:
   the first light emitter and the second light emitter emit light in different colors.

10. A camera comprising an illuminating device according to claim 1.

11. An illuminating device, comprising:
    a substrate;
    a light emitting member that comprises a first light emitter mounted at a first surface of the substrate and a second light emitter mounted directly at a second surface which is a back side of the first surface;
    a reflecting member that reflects a first light emitted from the first light emitter; and
    a projection optical member projects the first light emitted from the first light emitter and then reflected at the reflecting member and a second light emitted from the second light emitter, wherein:
    the projection optical member emits the first light and the second light from a substantially same part of the projection optical member.

12. An illuminating device according to claim 11, wherein:
    the first light emitter and the second light emitter are each constituted with an LED array.

13. An illuminating device according to claim 11, wherein:
    the first light emitter and the second light emitter emit light with a uniform level of luminance.

14. An illuminating device according to claim 11, wherein:
    the reflecting member is formed so as to have a parabolic cross-section.

15. An illuminating device according to claim 11, wherein:
    the projection optical member includes a diffusion lens.

16. An illuminating device according to claim 11, wherein:
    the first light emitter and the second light emitter emit light in different colors.

17. A camera comprising an illuminating device according to claim 11.

* * * * *